United States Patent [19]
Rohr

[11] 3,978,374
[45] Aug. 31, 1976

[54] METHOD AND APPARATUS FOR THE DETECTION OF SHORT CIRCUITS

[75] Inventor: André Rohr, Geneva, Switzerland

[73] Assignee: Societe Anonyme des Ateliers de Secheron, Geneva, Switzerland

[22] Filed: Dec. 6, 1974

[21] Appl. No.: 530,147

[30] Foreign Application Priority Data
Dec. 14, 1973  Switzerland................ 17524/73

[52] U.S. Cl.................... 317/49; 317/27 R; 317/36 TD
[51] Int. Cl.²........................ H02H 3/08
[58] Field of Search.......... 317/49, 27 R, 38, 36 D, 317/33 SC, 31, 14 C, 36 TD; 307/235 R; 328/150, 132, 135

[56] References Cited
UNITED STATES PATENTS

| | | | |
|---|---|---|---|
| 3,419,757 | 12/1968 | Steen | 317/33 SC X |
| 3,657,605 | 4/1972 | Hill | 317/36 TD |
| 3,796,918 | 3/1974 | DeForest et al. | 317/27 R |
| 3,822,399 | 7/1974 | Grund et al. | 328/151 X |
| 3,828,259 | 8/1974 | Riethmuller et al. | 328/151 |
| 3,836,790 | 9/1974 | Becker | 317/31 X |

*Primary Examiner*—J D Miller
*Assistant Examiner*—Patrick R. Salce
*Attorney, Agent, or Firm*—Oblon, Fisher, Spivak, McClelland & Maier

[57] ABSTRACT

A method for the detection of short circuits in electrical installations, in particular on railway contact wires, comprising generating a measuring signal dependent on the derivative with respect to time of the monitored current, comparing the measuring signal with at least one limit value, determining the time for which the measuring signal exceeds a limit value, comparing the time with a preset time interval, initiating indication of a short circuit when the time for which the measuring signal exceeds the limit value also exceeds the time interval, checking the measuring signal on the occurrence of a decrease following an initial increase and on the occurrence of a subsequent increase, and generating a blocking signal inhibiting indication of a short circuit as a function of the occurrence of such a subsequent increase.

6 Claims, 6 Drawing Figures

3,978,374

METHOD AND APPARATUS FOR THE DETECTION OF SHORT CIRCUITS

BACKGROUND OF THE INVENTION

1. Field of the Invention

The invention concerns a method for the detection of short circuits in electrical installations, in particular on railway contact wires, whereby a measuring signal dependent on the derivative with respect to time of the monitored current is generated and compared with at least one limit value, and whereby the time for which the measuring signal exceeds a limit value is determined and compared with a preset time interval. When the time for which the measuring signal exceeds the limit value also exceeds this time interval, this fact is used to initiate indication of a short circuit. The invention further concerns apparatus for executing such a method.

2. Description of the Prior Art

Methods and apparatus of the kind stated above have already been proposed for application in the monitoring of short circuits on direct-current contact wires of electrical railways, whereby if the measuring signal exceeds a limit value for a length of time greater than a preset time interval, indication of a short circuit is initiated immediately together with disconnection of the affected line section. This technique has proved increasingly unreliable, especially in the case of sections with a high traffic frequency, which can result in current being drawn by a number of traction vehicles on one section of line between two power supply substations. In the event of the starting currents of different traction vehicles, or of the motor sets of multiple compositions, becoming superimposed on each other, this can give rise to current-flow conditions in which the amplitude of the current and its differential decay time, or the time for which it exceeds a limit value, are of an order of magnitude similar to that of short circuits.

The proposed measures therefore no longer allow a sufficiently clear distinction between short circuits and operating conditions which are still acceptable, and lead to unnecessary disconnections and hence interruptions of service.

SUMMARY OF THE INVENTION

An object of the invention is therefore to create a method of detection, together with corresponding apparatus, which in large measure allows a distinction to be made between short circuits and superposed operating conditions which do not require disconnection. In association with the features described above, this object is achieved in that the measuring signal is checked on the occurrence of a decrease following an initial increase and also on the occurrence of a subsequent increase, and a blocking signal inhibiting indication of a short circuit is generated as a function of the occurrence of such a subsequent increase.

This solution of the problem is based on the knowledge that, in practice, rises of current under still acceptable superposed operating conditions are, with a very high degree of probability, always staggered in time, i.e., occur in a stepwise manner, and indeed also in the event of coordinated or simultaneous starting commands to the motor sets of a multiple traction composition. With a short circuit, on the other hand, the rise of current is virtually always more or less monotonic. In accordance with the invention, therefore, the measuring signal, which corresponds to the time derivative of the line current, is subjected to two essentially simultaneous checks; on the one hand, a check as to whether a limit value has been exceeded for an unacceptably long time, and on the other hand, a check on whether a subsequent increase occurs after an initial rise to a maximum followed by a decrease to a minimum. If such a subsequent increase has taken place, the indication of a short circuit initiated by the first of these checks is blocked and the operating condition is designated as being still acceptable, even though the time for which the time/current differential exceeds the limit value is in the short-circuit range and the amplitude of the subsequent increase is also similar to that of a short circuit. Here it should be noted that, in general, short circuits under the considered circumstances do not necessarily need to be interrupted because of their excessive line current, but primarily because of the effects of the arc (damage due to the action of heat and the risk of fire beyond the site of the short circuit).

The method of the invention is conveniently executed in such a way that a sequential signal derived from the measuring signal is generated which follows the measuring signal when the latter first rises and then falls to a first minimum, and is held at this minimum, whereupon the blocking signal is generated according to whether a preset difference between measuring signal and sequential signal is attained when the measuring signal rises again after the first minimum. A sequential signal of this kind is easy to generate in terms of circuitry, and through being held at the first minimum, followed by detection of a preset minimum difference relative to the measuring signal, permits reliable evaluation which is insensitive to unavoidable interference and signal fluctuations. The consecutive first extreme values of the measuring signal can in principle also be detected in a different manner, for example by means of delay devices with determining of the arithmetic sign of the difference between delayed and non-delayed measuring signal.

The foregoing and other objects are attained in accordance with one aspect of the present invention, through the provision of a monitoring circuit configuration with the following component parts:

a. a measuring-signal emitter with a current-differentiating element, connected to a current path of the installation to be monitored;

b. a limit-value switch which switches between two states when the measuring signal rises above, and falls below, a limit value;

c. a time switch located after the limit-value switch, with a preset switching time serving as a reference interval;

d. a time-comparator stage connected to the output of the time switch and the output of the limit-value switch;

e. an extreme-value detector, located after the time-comparator stage, which supplies a blocking signal if the measuring signal exhibits a first maximum followed by a minimum;

f. a logic circuit, actively connected to the output of the time-comparator stage and to the output of the extreme-value detector, which supplies an overcurrent signal as an indication of a short circuit if the measuring signal exceeds the limit value for a time longer than the reference interval and if there is no blocking signal present.

Such a circuit configuration is distinguished by its simplicity and reliability. The limit-value switch, time-comparator stage and extreme-value detector can be constructed with conventional devices employing analogue techniques with digital logic, and can be used without difficulty to control the usual switching devices for interrupting short circuits.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
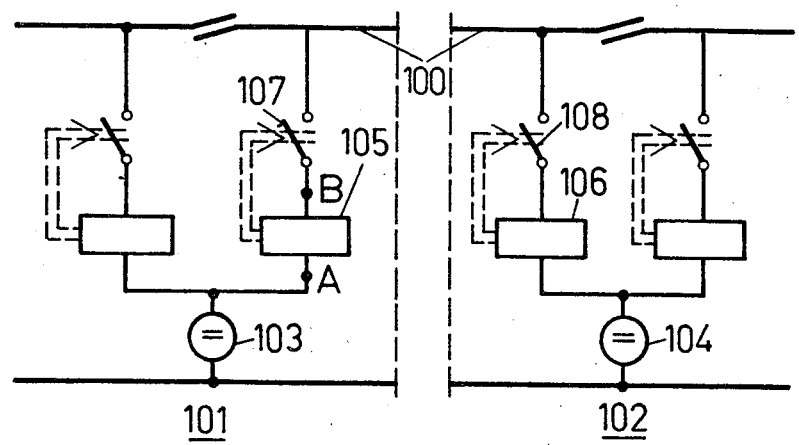
FIG. 1 shows the general arrangement of a section of contact wire having at each end power supply substations which are monitored for overcurrents.

Referring now to the drawings, wherein like reference numerals designate identical or corresponding parts throughout the several views, and more particularly to FIG. 1 thereof, FIG. 1 shows a section 100 of a d.c. contact wire system having at each end substations 101 and 102 and also their associated d.c. power sources 103 and 104, respectively. For each end of the neighboring line sections, each substation incorporates a monitoring circuit 105 or 106, together with their respective circuit-breakers 107 and 108.

Figure 2A:
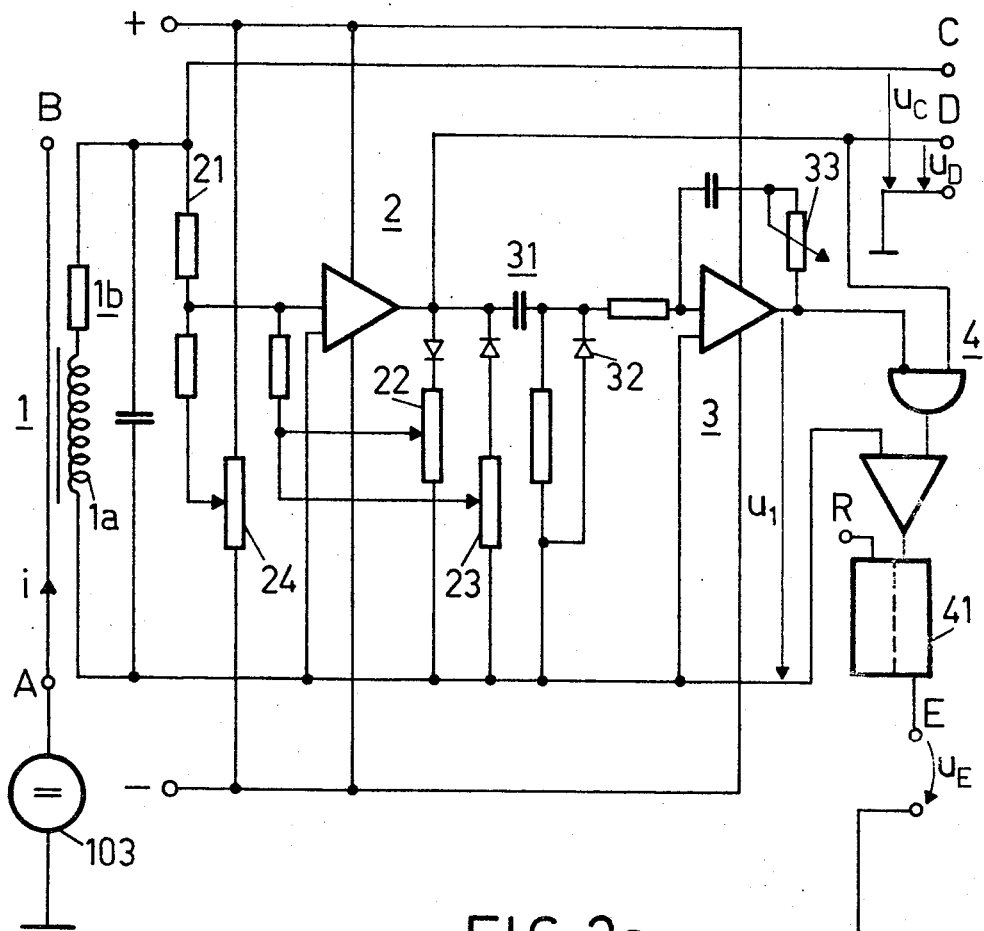
FIG. 2a is a circuit diagram of a differential measuring-signal emitter with limit-value switch and time-comparator stage.

In FIG. 2a, a measuring-signal emitter 1, comprising essentially a current-differentiating element 1a in the form of a current transformer, is located between points A and B of FIG. 1 and receives the direct current $i$ supplied from d.c. source 103. The measuring signal $u_C$, proportional to the time derivative of the current, is smoothed with regard to its harmonics content by a filter 1b and is passed for further use to point C as the output of the measuring-signal emitter, and also to the input of the limit-value switch 2. The latter comprises a bistable flip flop with a d.c. voltage control input 21 and the usual hysteresis control characteristic, the upper and lower switching points of which can be adjusted with potentiometer 22 or 23, respectively. Both switching points can be varied jointly by means of an input potentiometer 24. In total, therefore, the potentials of both switching points can be adjusted freely to the desired absolute values. A first, higher, limit value of the measuring signal thus serves as the switch-on point of the limit-value switch, and a second, lower, limit value of the measuring signal as the switch-off point. The limit-value switch is in the initial state before the measuring signal rises above the first limit value and after it falls below the second limit value; between these it is in the on-state. Consequently, at output D of the limit-value switch there appears a rectangular pulse equal in duration to the time the measuring signal exceeds a limit value.

The input of the subsequent time-comparator stage 3 is generated by a differentiating element 31 with diode 32, which passes on only the positive intial pulse when the limit value is exceeded. Further to this, the time-comparator stage comprises a monostable flip flop with an on-time, adjustable with potentiometer 33, as a reference interval $T_r$. Thus the monostable flip flop is turned on at the beginning of the time, the limit value is exceeded, and switches back when the prescribed reference interval has elapsed. An AND gate 4, with an inverse input connected to the limit-value switch, supplies an affirmative signal on the output side only when the limit-value switch is still in the on-state, whereas the time-comparator stage has already returned to the off-state, i.e. when the time the limit value has been exceeded is longer than the reference interval. In this case a bistable flip flop 41 is turned on and provides at its output E a short-circuit indication signal $u_E$ which is further processed in connection with detection of a subsequent increase. Flip flop 41 is turned off again at a suitable moment by means of a reset input R.

Figure 2B:
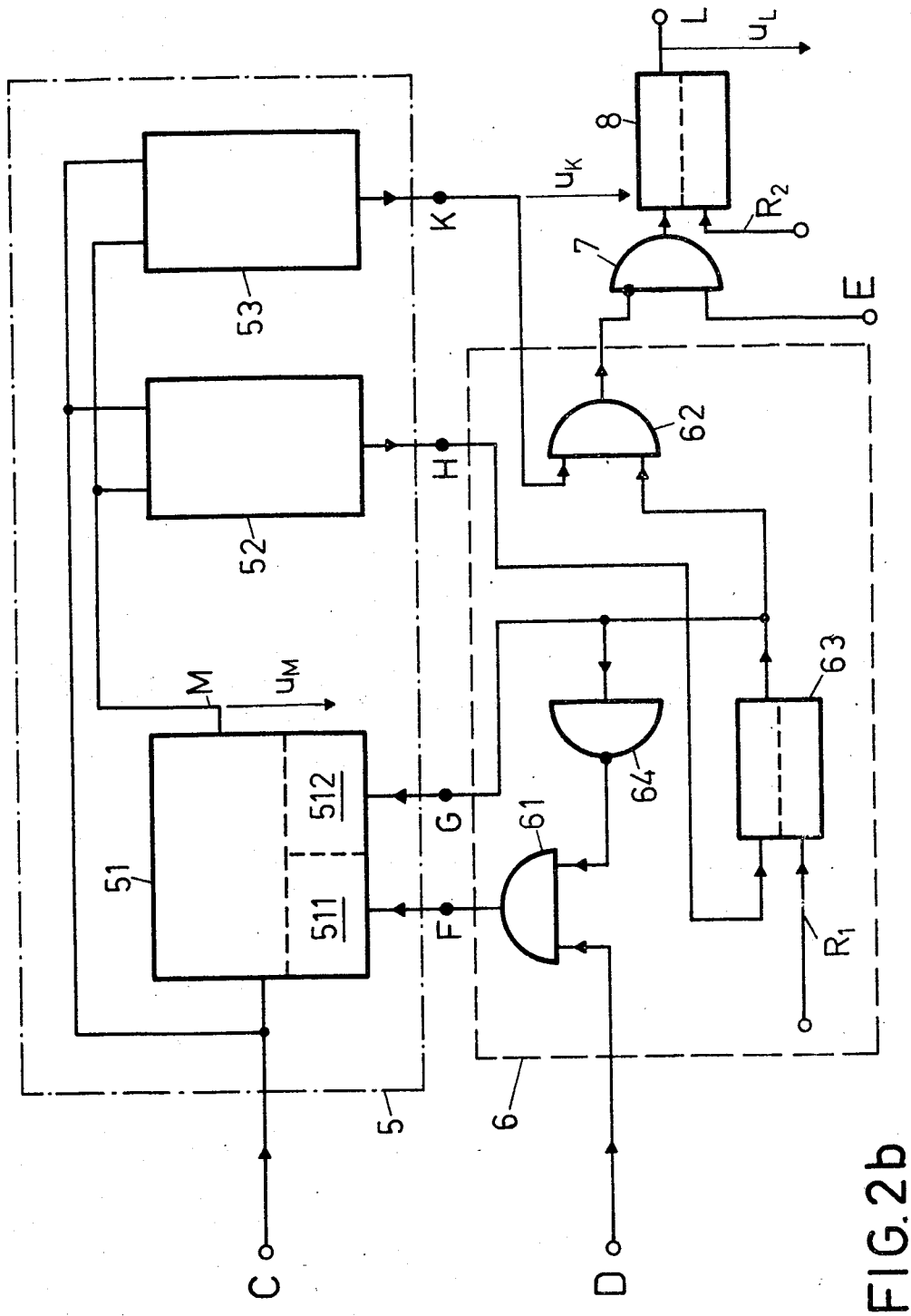
FIG. 2b is a block diagram of a succeeding extreme-value detector and its associated control circuit.

The part of the circuit shown in FIG. 2b comprises an extreme-value detector 5 with signal-sequence circuit 51, which is fed with the measuring signal $u_C$ from circuit point C, and also a descent detector 52 and an ascent detector 53. The outputs H and K, respectively, of these detectors modulate a control circuit 6 which in addition receives the signal "limit value exceeded" $u_D$ from point D of FIG. 2a and in turn modulates two follow-up control circuits 511 and 512 of signal-sequence circuit 51 via two outputs F and G, respectively, and also drives an AND gate 7 for supervising the short-circuit indication signal $u_E$.

Figure 2C:
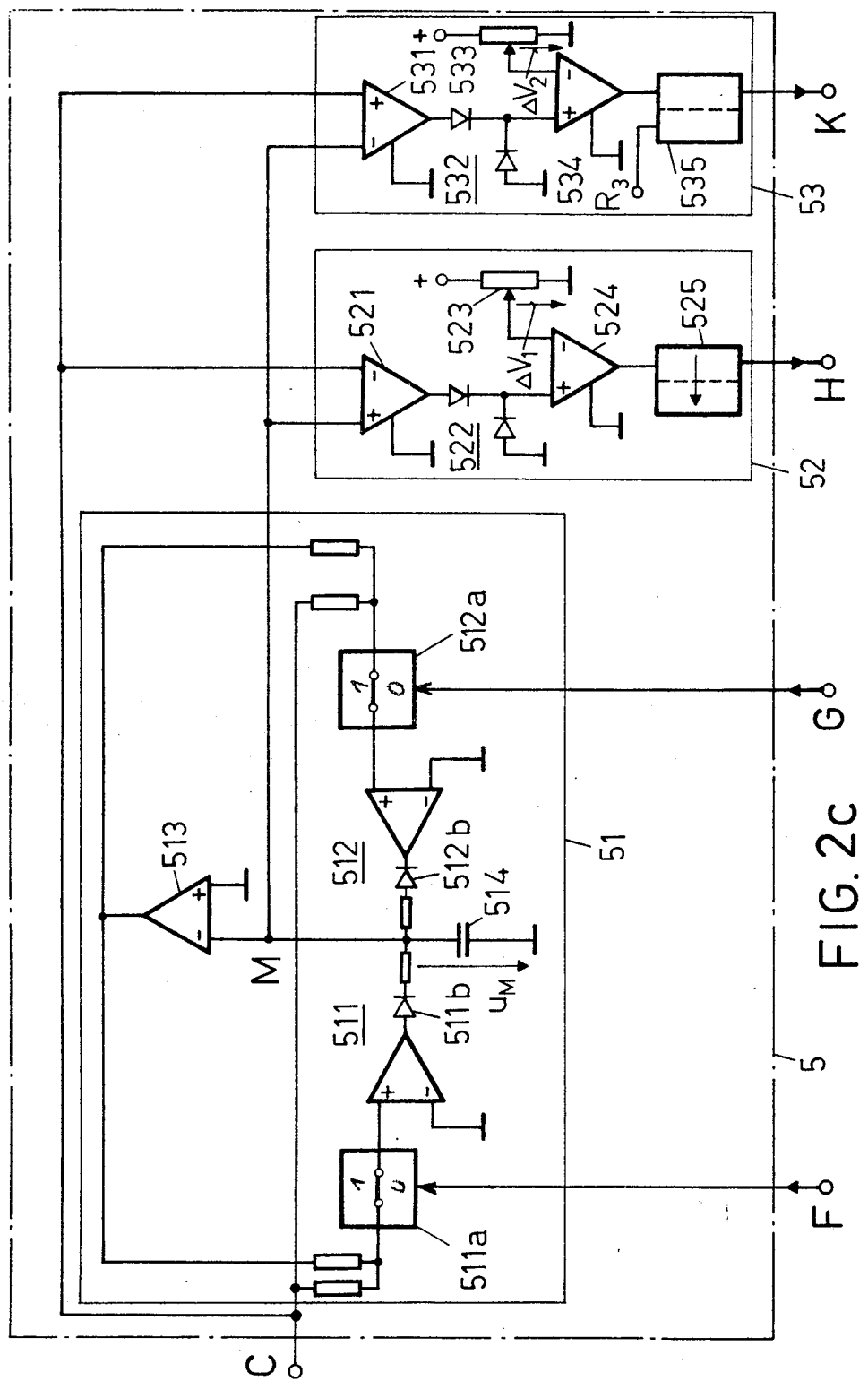
FIG. 2c is a detailed circuit diagram of the extreme-value detector shown in FIG. 2b.

Control circuit 6 comprises two AND gates 61 and 62, and also a bistable flip flop 63 and an inverter 64 with a reset input $R_1$. The flip flop 63 assumes the off-state before $u_D$ arrives, so that the AND gate 61 is made ready by way of inverter 64 and output F carries an affirmative signal immediately when $u_D$ arrives. In this way the follow-up control circuit 511, which has the effect of following the reduction of measuring signal $u_C$, is blocked and the state of signal-sequence circuit 51, until this moment effective in both directions, is interrupted in one direction. This is of no consequence while $u_C$ is rising, but takes effect when a first maximum is reached followed by a decrease, whereupon the sequence signal $u_M$ present at the output M of the signal-sequence circuit 51 retains the previously attained maximum value of $u_C$ until the descent detector 52 responds and turns on the flip flop 63 via output H. This has the effect of blocking the AND gate 61 and output G receives an affirmative signal, whereupon the follow-up control circuit 511 is re-connected and the follow-up control circuit 512, which has the function of following an increase, is disconnected. This becomes effective when the subsequent minimum of $u_C$ is reached, in which case $u_M$, which in the meantime has attained the value of $u_C$, is held until a preset difference value is reached during a subsequent increase in $u_C$ and ascent detector 53 responds. As a result, output K receives an affirmative signal in the form of a blocking signal $u_K$, and so the AND gate 62, made ready in the meantime by the output of flip flop 63, receives an affirmative output signal, and AND gate 7 is blocked via an appropriate inverse input. Because the indication of a short circuit $u_E$ appears immediately at the end of the reference interval $T_r$, even if the time for which the limit value is exceeded is longer, any subsequent increase detected after this moment has no effect at the inverse input of gate 7. The previously arrived indication of a short circuit $u_E$ has by then already passed gate 7 and triggered a flip flop 8, which then supplies a persistent overcurren signal $u_L$ until reset by way of reset input $R_2$. On the other hand, if a subsequent increase is detected before the end of the reference interval $T_r$, this being accompanied by a blocking signal $u_K$ which also persists until reset, any further indication $u_E$ of a short circuit remains ineffective because gate 7 is blocked, and $u_L$ does not appear. As shown in FIG. 2c, each of the follow-up control circuits 511 and 512 contains a switch 511a or 512a controlled via input F or G which is closed in the presence of a negating control signal O and open when the control signal is affirmative (normally closed contact). Thus, when the control signal at the appropriate input F or G is affirmative, the corresponding follow-up circuit is disconnected. These switches are located at the inputs to summing amplifiers having at their outputs diodes 511b and 512b of opposite polarity, and at their inputs summing resistors which are fed, on the one hand, with the measuring signal $u_C$ via C and, on the other, with a summation signal generated and stored at a capacitor 514 and received from the outputs of the summing amplifiers following polarity reversal in an inverter 513. As soon as the voltage $u_M$ at capacitor 514 is smaller than $u_C$, the follow-up circuit 511 gives rise to a charging current for the capacitor 514, while in the converse case follow-up circuit 512 gives rise to a discharge current. Thus only one of the two circuits is active at any given time, the circuit first mentioned causing $u_M$ to follow an increase in $u_C$, and the circuit mentioned second causing $u_M$ to follow a decrease in $u_C$.

The construction and operating principle of the descent detector 52 are as follows: A differential amplifier 521 supplies at its output an output voltage which corresponds to the difference between $u_M$ and $u_C$ and which passes via a diode combination 522 to the normal input of another differential amplifier 524 only when it is of positive polarity. The inverse input of the last-mentioned amplifier is fed with a voltage $\Delta V_1$, adjusted by means of potentiometer 523, which corresponds to a preset minimum value of the difference between $u_M$ and $u_C$. Only when this difference exceeds the stated minimum value with greater $u_M$ and smaller $u_C$ does the output of the differential amplifier 524 carry a positive output signal which alone acts as an affirmative control signal and holds a succeeding monostable flip flop 525, which has a vanishingly small inherent reset time, in the on-state with an affirmative output signal at H for the duration of this affirmative control signal. Thus the rate of fall is detected as required, and as assumed in the description of FIG. 2b, at point H.

When $u_C$ is greater than $u_M$, corresponding remarks apply to the ascent detector 53, with its differential amplifiers 531 and 534, diode combination 532, potentiometer 533 with adjustable minimum difference $\Delta V_2$, and flip flop 535, in this case of the bistable type, with reset input $R_3$. Owing to the reversed input polarity of differential amplifier 531, a positive voltage admitted by diode combination 532 appears at the normal input of differential amplifier 534 only when $u_C$ is greater than $u_M$, thus resulting in the required detection of rate of rise in relation to the stated minimum difference.

Figure 3:
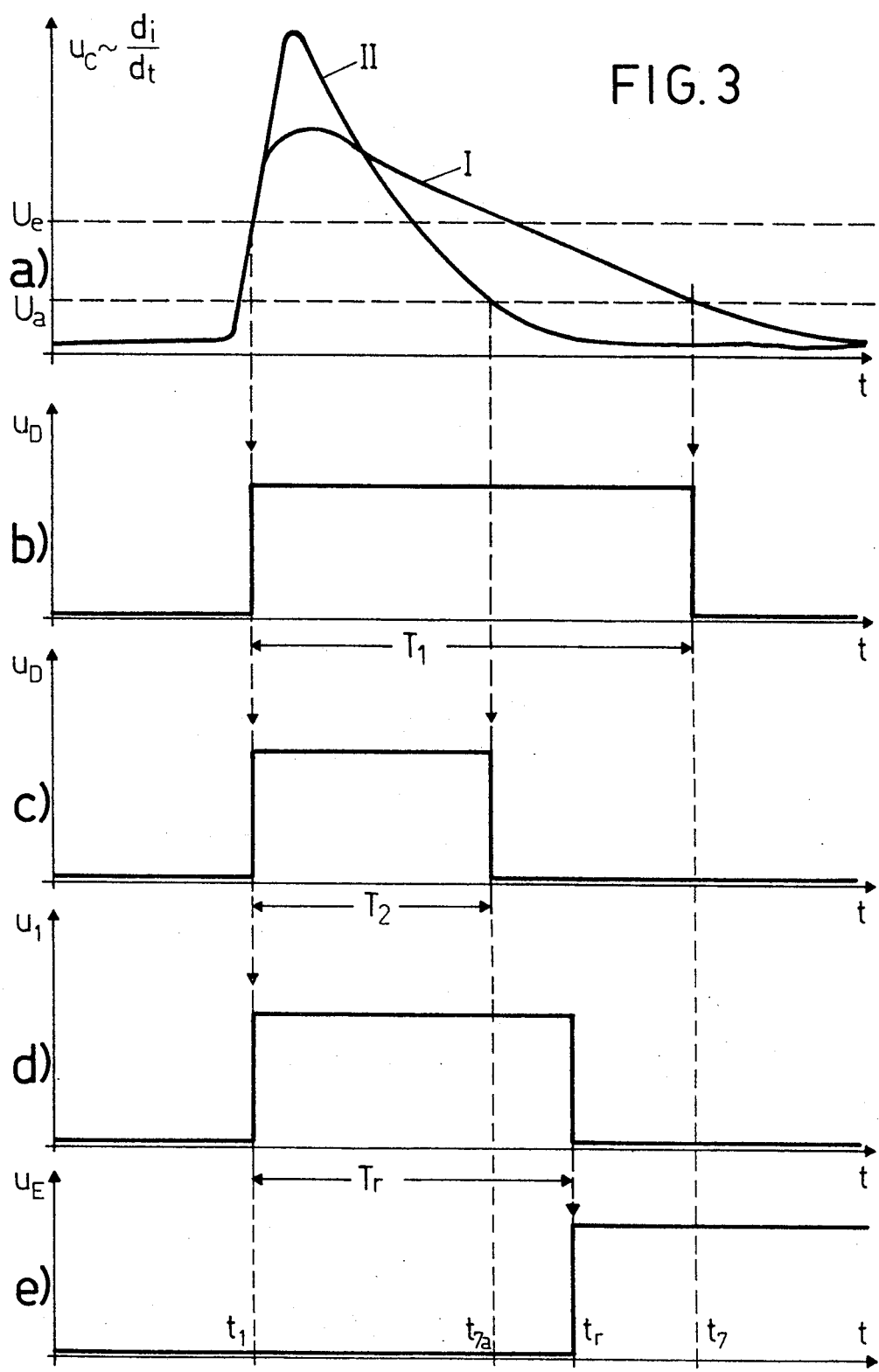
FIG. 3 is a multiple time diagram illustrating the operating principle of the limit-value switch with the time-comparator stage.

The following remarks refer to FIG. 3, which illustrates the signal pattern of the part of the circuit shown in FIG. 2a. Line (a) shows two different curves of $u_C$; a first curve I with a lower maximum and relatively flat descent, and a second curve II with a high maximum and steeper descent. The former corresponds to a short circuit, since there is no subsequent rise. The potentials of the switch-on and switch-off points of limit-value switch 2 are denoted $U_e$ and $U_a$, respectively. In this example, therefore, $u_C$ is compared with two limit values, namely the higher increase limit value $U_e$ and the lower decrease limit value $U_a$. Line (b) shows the duration $T_1$ of the "limit value exceeded" signal $u_D$ between times $t_1$ and $t_7$ for curve I, while line (c) shows the time $T_2$ during which the limit value is exceeded between $t_1$ and $t_{7a}$ for curve II. Line (d) indicates the behavior of output voltage $u_1$ of the time-comparator stage 3 with the set reference interval $T_r$. This interval ends later than $T_2$ but earlier than $T_1$ so that, in the case of curve I, at the end of $T_r$, i.e., from moment $t_r$, an indication of a short circuit in the form of a voltage $u_E$ is produced via AND gate 4 and flip flop 41.

Figure 4:
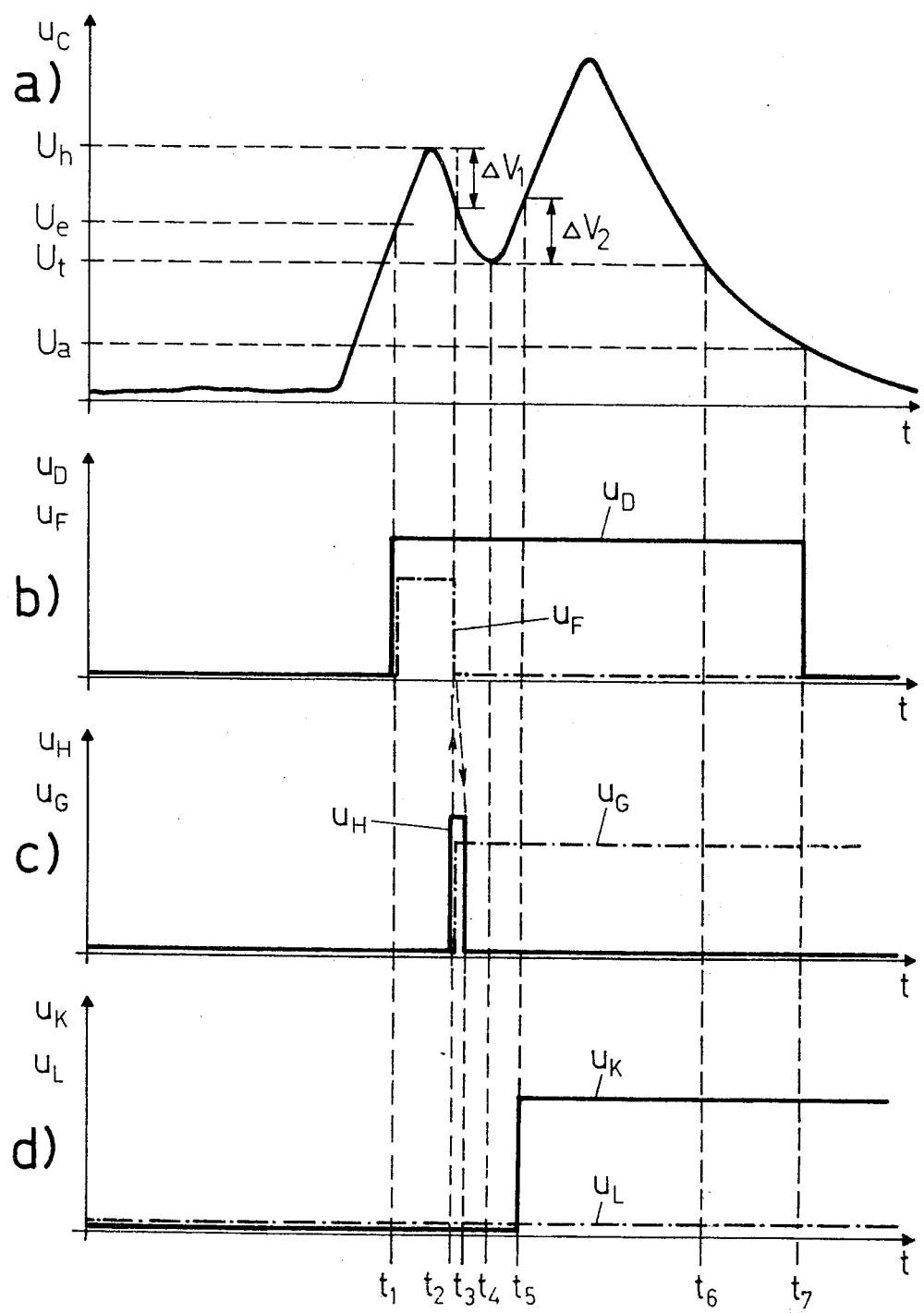
FIG. 4 is a multiple time diagram illustrating the operating principle of the extreme-value detector with its control circuit.

The manner of operation of the parts of the circuit shown in FIG. 2b and FIG. 2c is illustrated in FIG. 4.

Line (a) shows a curve of $u_C$ with a subsequent increase after a first maximum $U_h$ and a minimum $U_t$. At $t_1$ the switch-on point Ue of the limit-value switch is exceeded, and hence the "limit value exceeded" signal $u_D$ indicated in line (b) is initiated. At the same time, circuit point F carries the output of the AND gate 61, as shown in FIG. 2b, in the form of an affirmative signal $u_F$, thus preventing $u_M$ from following the descent. This becomes effective when $U_h$ is passed, and at time $t_2$ causes the descent to be detected with affirmative signal $u_H$, as shown in line (c), at point H in FIG. 2b. After a delay — shown in exaggerated form in line (b) — the descent is again followed from time $t_3$, so that $u_H$ is again also negated, i.e., drops to zero. The first rise remains stored by flip flop 63, however, and allows the rise taking place after $U_t$ to be identified as a subsequent increase in the required sense of monitoring the short-circuit indication via the AND gate 62 of FIG. 2b.

Line (c) of FIG. 4 also shows the affirmative signal $u_G$ at the output of flip flop 63 which continues from the detection of the descent at $t_2$ until it is reset (not shown), and prevents the ascent from being followed. The subsequent increase is detected at time $t_5$ with affirmative signal $u_K$, which persists after the positive value of $u_C - u_M$ disappears at time $t_6$ until the flip flop 535 in ascent detector 53 is reset (not shown).

The overcurrent signal $u_L$ shown in line (d), together with $u_K$, thus remains negated.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters Patent of the United States is:

1. A method for the detection of short circuits in electrical installations, in particular on railway contact wires, comprising:

generating a measuring signal dependent on the derivative with respect to time of the monitored current, comparing the measuring signal with at least one limit value, determining the time for which the measuring signal exceeds a limit value, comparing the time with a preset time interval, initiating indication of a short circuit when the time for which the measuring signal exceeds the limit value also exceeds the time interval, checking the measuring signal on the occurrence of a decrease following an initial increase and on the occurrence of a subsequent increase, and generating a blocking signal inhibiting indication of a short circuit as a function of the occurrence of such a subsequent increase.

2. A method as claimed in claim 1, in which a sequential signal derived from the measuring signal is generated which follows the measuring signal when the latter first rises and then falls to a first minimum, and is held at this minimum, and the blocking signal is generated according to whether a preset difference between measuring signal and sequential signal is attained when the measuring signal rises again after the first minimum.

3. A method as claimed in claim 2, in which the sequential signal is held at the first maximum and the sequential signal is released in order to follow the measuring signal until the first minimum when a difference between measuring signal and sequential signal is reached together with detection of the first increase of the measuring signal.

4. A monitoring circuit for the detection of short circuits in electrical installations, in particular on railway contact wires, comprising:

a measuring-signal emitter with a current-differentiating element, connected to a current path of the installation to be monitored;

a limit-value switch which switches between two states when the measuring signal rises above, or falls below, a limit value;

a time switch located after the limit-value switch, with a preset switching time serving as a reference interval;

a time-comparator stage connected to the output of the time switch and the output of the limit-value switch;

an extreme-value detector, located after the time-comparator stage, which supplies a blocking signal if the measuring signal exhibits a first maximum followed by a minimum with subsequent increase;

a logic circuit, actively connected to the output of the time-comparator stage and to the output of the extreme-value detector, which supplies an overcurrent signal as an indication of a short circuit if the measuring signal exceeds the limit value for a time longer than the reference interval and if there is no blocking signal present.

5. Circuitry as claimed in claim 4, in which the extreme-value detector comprises a signal-sequence circuit with two follow-up control circuits, one being allocated to following the decrease of the measuring signal and the other to following the increase of the measuring signal, and each is capable of being connected and disconnected separately.

6. Circuitry as claimed in claim 5, in which the extreme-value detector comprises a descent detector and an ascent detector connected after the signal-sequence circuit, and in which a control circuit is provided having as its inputs the output of the limit-value switch, the output of the descent detector and the output of the ascent detector, the control circuit having two outputs each being allocated to one of the two follow-up control circuits of the signal-sequence circuit so that the control circuit disconnects the follow-up circuit following an increase when the measuring signal exceeds a first limit value, and re-connects it again when a decrease of the measuring signal is detected after a first maximum has been reached, at the same time disconnecting the follow-up circuit having the function of following an increase.

* * * * *